S. H. KEEFER.
MOTOR CONTROLLING APPARATUS.
APPLICATION FILED FEB. 21, 1910.
1,003,269.
Patented Sept. 12, 1911.
3 SHEETS—SHEET 2.
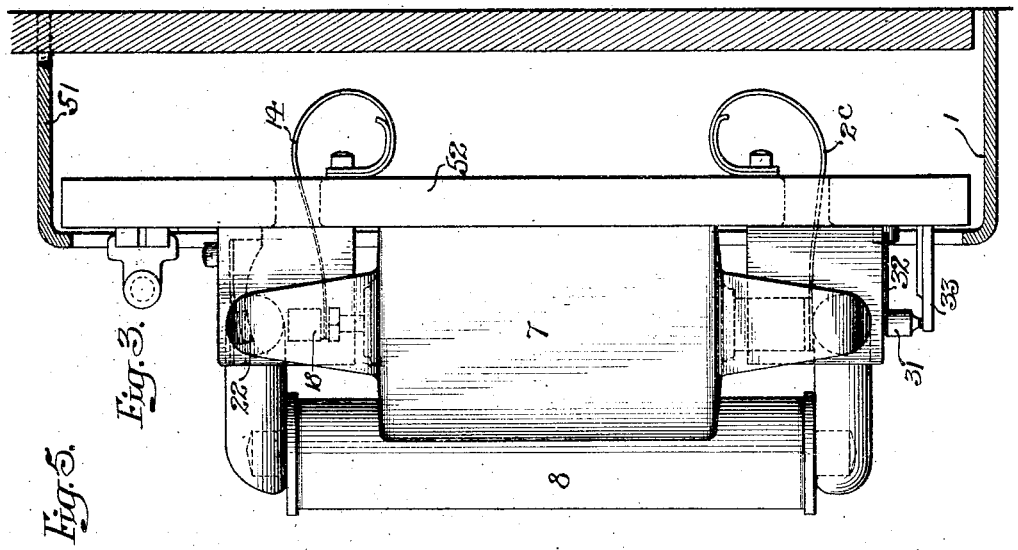
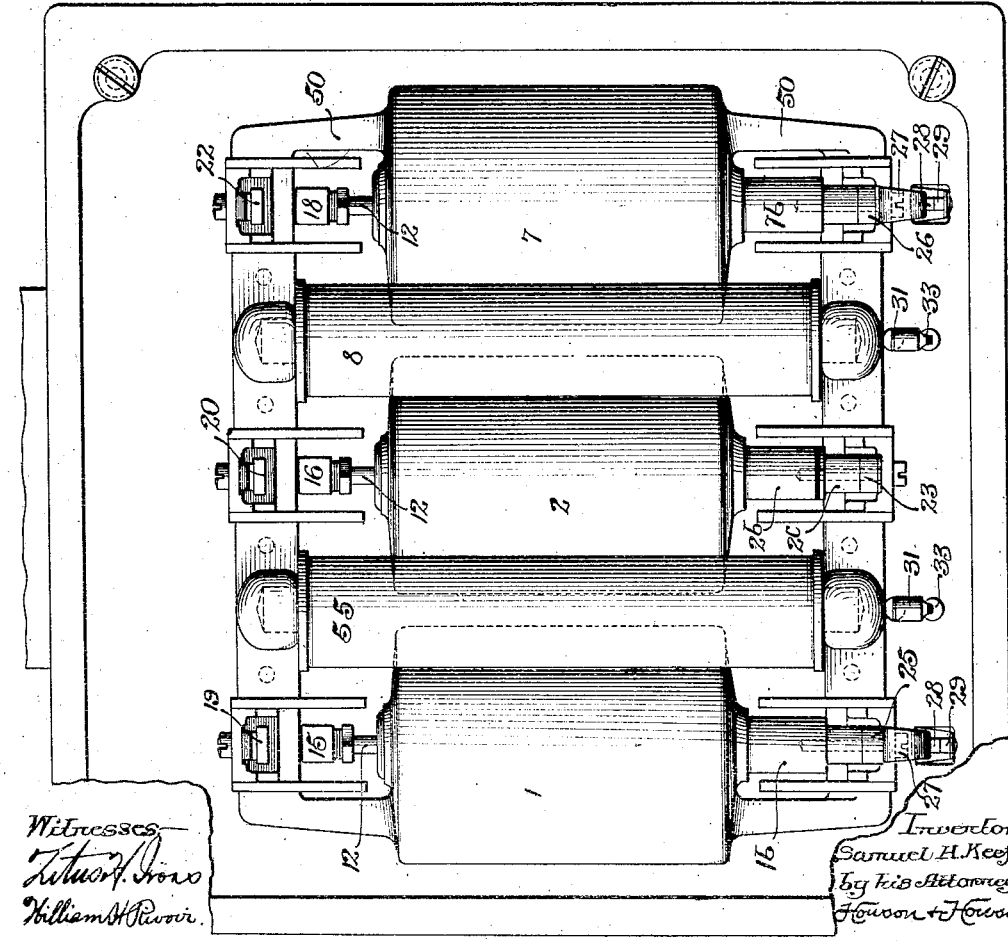

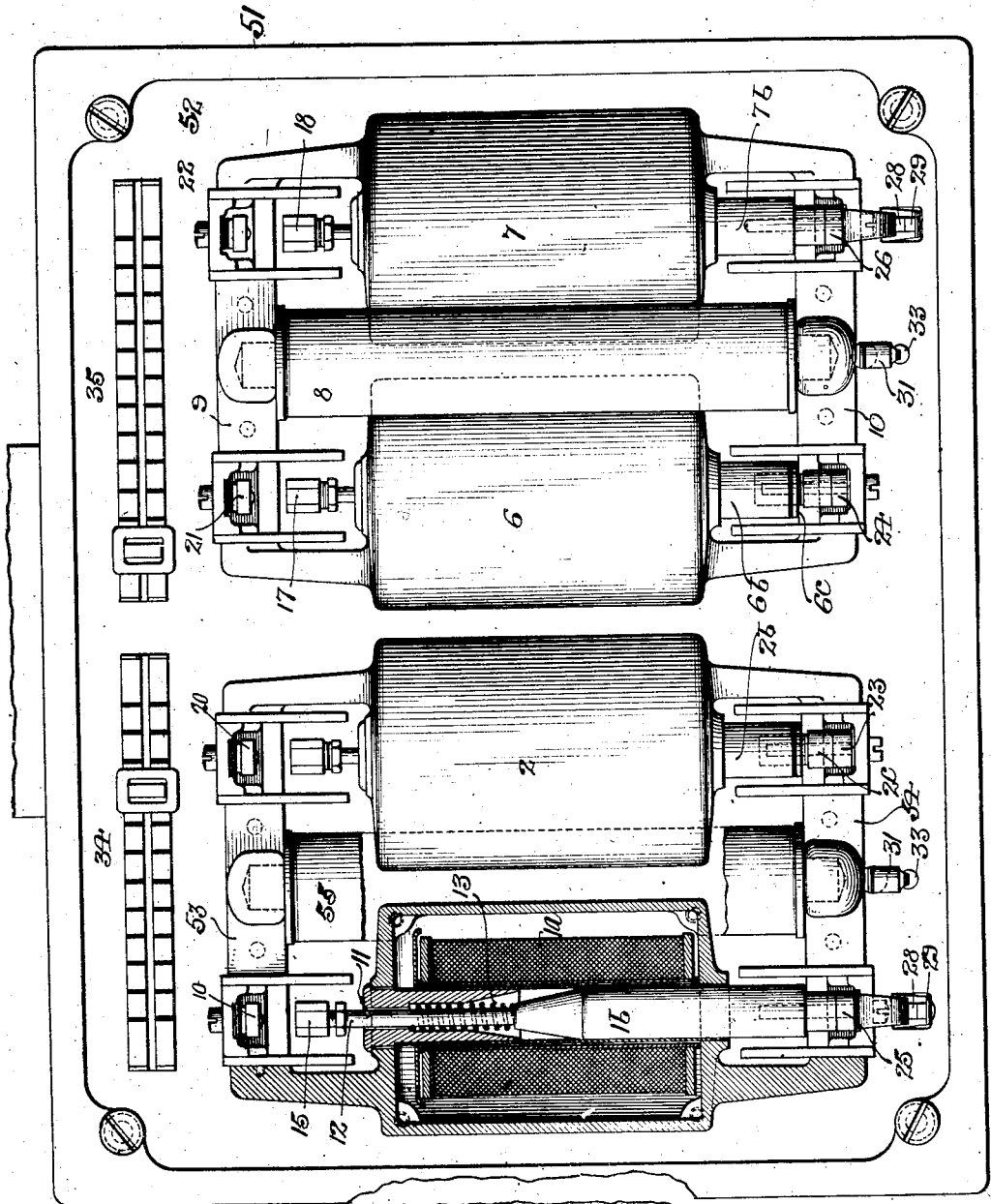

S. H. KEEFER.
MOTOR CONTROLLING APPARATUS.
APPLICATION FILED FEB. 21, 1910.
1,003,269.
Patented Sept. 12, 1911.
3 SHEETS—SHEET 3.
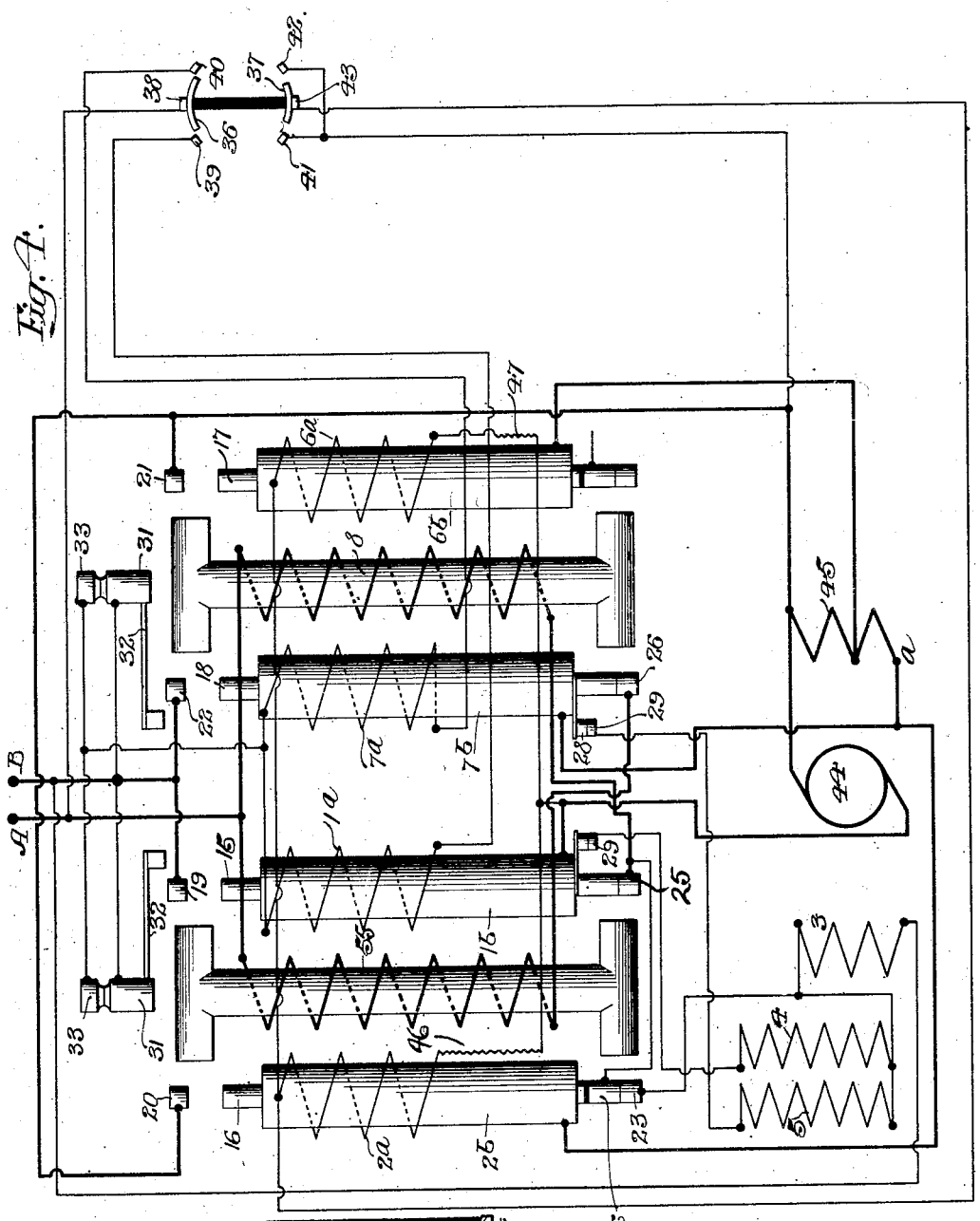
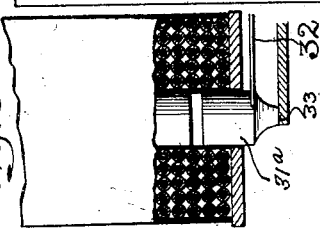
Witnesses
Inventor
Samuel H. Keefer
by his Attorneys
Howson & Howson

UNITED STATES PATENT OFFICE.

SAMUEL HINE KEEFER, OF PLAINFIELD, NEW JERSEY, ASSIGNOR TO NILES-BEMENT-POND COMPANY, OF JERSEY CITY, NEW JERSEY, A CORPORATION OF NEW JERSEY.

MOTOR-CONTROLLING APPARATUS.

1,003,269. Specification of Letters Patent. Patented Sept. 12, 1911.

Application filed February 21, 1910. Serial No. 545,134.

*To all whom it may concern:*

Be it known that I, SAMUEL H. KEEFER, a citizen of the United States, and a resident of Plainfield, New Jersey, have invented certain Improvements in Motor-Controlling Apparatus, of which the following is a specification.

My invention relates to that class of apparatus especially designed to control the current flow to an electric motor, in which the main motor controlling switches are governed by electromagnetic means such as solenoids, the energization of whose windings is controlled by a pilot switch.

One object of the present invention is to provide a system of apparatus of the above noted class which shall include relatively simple and reliable means for preventing the energization of the solenoid windings after current has once been cut off from the motor, until the current generated by the motor when it is short circuited upon itself, has fallen to a predetermined and relatively small amount.

Another object of the invention is to provide a system of apparatus of the class above indicated which shall include blow out magnets for certain of the switches, and automatic means controlled by said blow out magnets for determining when current shall be admitted to the windings of the main switch controlling solenoids.

Another object of my invention is to provide a system including automatic switches for preventing the energization of the electromagnetic motor controlling switches and in which the arrangement of parts is such that two windings are energized when the motor is short circuited on itself and therefore keep open the circuit of the main switch controlling solenoids until the speed of the motor and therefore the electromotive force generated by it has fallen to a predetermined and relatively low point.

These objects and other advantageous ends I secure as hereinafter set forth, reference being had to the accompanying drawings in which:—

Figure 1, is a front elevation of a combination of apparatus arranged and constructed according to my invention; Fig. 2, is a vertical section illustrating the detail construction of a part of the apparatus shown in Fig. 1; Fig. 3, is a side elevation of the apparatus shown in Fig. 1; Fig. 4, is a diagrammatic view illustrating the electrical connections of the apparatus shown in Fig. 1; Fig. 5, is a front elevation of a modified arrangement of apparatus, and, Fig. 6, is a modified view of one of the switches employed by me.

In Figs. 1 to 4 inclusive, 51 represents a metallic frame or casing on which is mounted a slab or plate 52 of insulating material, serving as a support for the apparatus hereinafter described. Said apparatus consists of a number of iron clad solenoids, in the present instance four, arranged in sets of two each. Of these solenoids, those indicated at 1 and 2 have their iron casings connected by pole pieces 53 and 54 and have mounted between and slightly in front of them, a blow out magnet 55 whose core forms part of the magnetic circuit including said pole pieces and casings. Similarly, the other pair of solenoids, indicated at 6 and 7, have a common blow out magnet 8, whose core likewise forms part of a magnetic circuit including their casings and pole pieces 9 and 10. The four solenoids have windings, indicated respectively at $1^a$, $2^a$, $6^a$, and $7^a$, and cores $1^b$, $2^b$, $6^b$ and $7^b$, which are longitudinally movable within said windings. As shown in Figs. 1 and 3, each solenoid casing has centrally mounted in its upper end a plug 11 through which passes a rod 12 rigidly fixed to and forming an extension of its core, and there is a spring 13 mounted between said core and said plug, whereby the former is prevented from sticking to the plug and is promptly returned to its lower position when the solenoid winding is deënergized.

Electrically connected to each rod 12 is a flexible conductor 14 forming under operating conditions some portion of the main motor circuit and the various contacts 15, 16, 17, and 18 carried by these rods are designed to respectively engage fixed contacts 19, 20, 21, and 22.

To the lower ends of the cores $2^b$ and $6^b$ of the solenoids 2 and 6 are connected flexible conductors $2^c$ and $6^c$ of the construction shown in Fig. 3, which are electrically insulated from said cores. Immediately under these two cores are mounted fixed contacts 23 and 24, so placed as to be engaged by the contacts $2^c$ and $6^c$ when the cores carrying them are in their lower positions.

The cores $1^b$ and $7^b$ of the solenoids 1 and 7, when in their lower positions, are capable of engaging spring mounted contacts 25 and 26, each of which has projecting from it a spring 27 to which is fixed an auxiliary contact 28. A second auxiliary contact 29 is mounted on an arm 30 in such manner that after either of the cores $1^b$ or $7^b$, as the case may be, has fallen to its lower position so as to engage one of the contacts 25 or 26, the contact 28 is moved into engagement with the contact 29.

Within the magnetic circuits of the two blow out magnets 55 and 8, I place switches, which may be of the construction shown in Figs. 3 or 6 in the first of which the switch consists of an iron contact 31 carried on a spring arm 32 in such position as to be drawn toward the blow out magnet pole piece below which it is placed when said magnet is energized. When said blow out magnet is deënergized, this contact 31 rests in engagement with the contact 33, and as shown in Fig. 4 these two switches are connected in multiple between one of the supply mains and one end of the two solenoid windings 1 and 7; the arrangement being such that if either of the blow out magnets is energized the corresponding contacts 31 and 33 of one of the auxiliary switches are separated while current is free to flow through the other of the switches, though if both of the blow out magnets be energized both of said switches are opened and energization of either of the solenoid windings is impossible. To render clearer the illustration, the solenoids and certain of the switches are shown in Fig. 4 in positions differing from those in which they are shown in Fig. 1.

In case it should be found that the auxiliary switch shown in Fig. 3 is abnormally sensitive, I may arrange it as shown in Fig. 6, in which an iron armature $31^a$ is mounted to operate within the winding of the blow out magnet adjacent the end of the core thereof, which is cut off short for this purpose. The spring contact arm or current conductor 32 is as before connected to this contact piece and there is a fixed contact 33 so placed as to be engaged by said armature contact as long as the blow out magnet is deënergized.

Two switches 34 and 35 are provided for adjusting by hand the two field rheostats whose resistance is indicated at 4 and 5 and at any convenient point there is located a pilot switch, indicated in Fig. 4, which is provided with two segmental contacts 36 and 37 connected by a body of insulating material so as to be movable together. The first of these contacts is capable of electrically connecting a central contact $38^c$ with either of two side contacts 39 or 40, while the other of said contacts is similarly capable of connecting either of two contacts 41 or 42 with a central contact 43.

Under operating conditions the apparatus is connected to an electric motor as indicated at Fig. 4; the armature of said motor being shown at 44 and its armature resistance at 45. If the pilot switch is so operated that its contact 37 is made to connect the two contacts 41 and 43 and its contact 36 is at the same time caused to connect contacts 38 and 40, then current flows from the supply main A through contacts 38, 36 and 40, etc., the winding $7^a$ of the solenoid 7, and assuming that the motor is at rest, from the opposite end of this winding through one or both of the switches 33—31 and back to the supply main B; it being noted that previous to the operation of the pilot switch current is permitted to flow through the field winding 3 of the motor from the current supply main A, winding of blow out magnet 8, the switch $2^c$—23 and back to the main B. The energization of the winding $7^a$ of the solenoid 7 causes the core $7^b$ to be raised so that its contact 18 is brought into engagement with the contact 22, with the result that current is free to flow from the current supply main A through the blow out magnet 8, contact 25, core $1^b$, motor armature 44, all of the resistance 45, core $7^b$, contacts 18 and 22 and so back to the main B. The motor is thus caused to start and as soon as its counter electric force rises to a predetermined point, there is sufficient current flow from the said armature through the winding $6^a$ of the solenoid 6 to cause the core of said solenoid to be raised and its contact 17 to engage the contact 21. One section of the resistance 45 is thus short circuited, speeding up the motor and thereby causing such an increase of its counter electric motive force as will in turn cause the winding $2^a$ of the solenoid 2 to be energized sufficiently to raise its core $2^b$; the successive action of the two solenoids 2 and 6 being insured by connecting in circuit with their windings bodies of resistance 46 and 47 of unequal amounts. The raising of the core $2^b$ breaks the connection between the contacts $2^c$ and 23 so that the body of resistance 4 is placed in series with the field winding 3; the current then flowing from the main A through the blow out magnet 8, contact 25, core $1^b$, contacts 28 and 29, resistance 4 and field winding 3, to the main B. This weakening of the field still further speeds up the motor and immediately thereafter the contact 16 comes into engagement with the contact 20 thereby short circuiting the remainder of the armature resistance 45 and bringing the motor up to full speed. It will be noted that while the blow out magnet 8 is energized and therefore holds open the switch 33—31 which it controls, the other auxiliary switch is unaffected and being closed permits the current flow to the solenoid $7^a$. If now the pilot switch be moved to its off position as in Fig. 4, the three solenoid cores $2^b$, $6^b$, and $7^b$ at once drop to their lowest positions thus bringing the field of the motor back to its maximum strength and at the same time chort circuiting the armature of the motor on itself;—the current flowing from said armature to the core 1$^b$, contact 25, blow out magnets 8 and 55, contact 26, core 7$^b$, and back to said armature through resistance 45. The motor is thus caused to generate current and the revolution of the armature is quickly stopped according to the well known laws.

It will be noted that even if the pilot switch be moved from its " off " position to either of its " on " positions, current cannot be delivered to either of the solenoid windings 1$^a$ or 7$^a$ because both of the switches 33—31 are held open by reason of the energization of both of the blow out magnets 55 and 8, by the generated current. When this has fallen to a predetermined small amount, the contacts 31 are released and under the action of their springs 32, again engage the contacts 33 whereupon current may again be delivered to the motor armature if the pilot switch be in its " on " position, opposite that at first referred to. Under these conditions the motor is started in the same manner as previously described except that the solenoid 1 is energized, while the solenoid 7 is idle and current is therefore delivered to the motor armature 44 in a direction opposite that occurring when the solenoid 7 is energized. In every case, however, the motor cannot be started if both of the blow out magnets be energized and with the arrangement of parts shown this condition will occur whenever the motor armature is short circuited on itself. The field current still comes to the blow out coil 8 when the solenoid 1 is energized until the solenoid 2 is energized.

In some cases I may dispense with the solenoid 6 and combine the other three solenoids with the two blow out magnets in the manner indicated in Fig. 5. In such case the casing of the intermediate solenoid is not an essential part of the magnetic circuit of the blow out magnets although each of the outer solenoid casings is provided with pole pieces 50 connected to the blow out magnet cores and to each other by transverse pole pieces as before.

It will be understood that when the solenoid 1 is energized, the body 5 of field resistance is placed in circuit with the field winding 3, and as the amount of this resistance as well as that indicated at 4 may be varied by shifting the movable contacts over the fixed contacts 34 and 35, it is obvious that the motor may be caused to operate at any desired different speeds when it turns in opposite directions.

From the above description it will be noted that I have utilized the blow out magnets, which are necessarily provided for the various switch contacts, as the means for operating the auxiliary switches whereby flow of current to the reversing switch solenoids 1 and 7 is governed. It is moreover to be noted that with the arrangement of parts shown in Fig. 2, contact is made between the cores of both of the reversing switch solenoids and their contacts 25 or 26, before the circuit is completed between the contacts 28 and 29, since it is necessary that such contact 25 or 26 be pressed downwardly by its solenoid core in order to bring together said two contacts 28 and 29. This sequence of making and breaking contacts I have found to give the most satisfactory results in the operation of the motor controlled by the above described apparatus.

By the particular arrangement and construction of the auxiliary switch shown in Fig. 6, the operation of the device is rendered certain without being so sensitive as to operate at the wrong time.

I claim;—

1. A motor controlling system consisting of means for governing the flow of current to the motor including a plurality of electromagnetic main switches connected to serve as a reversing switch; a plurality of blow out magnets for said switches; with auxiliary switches controlled by the blow out magnets and connected to prevent the supply of current to the windings of the electromagnets for said main switches until the current in the blow out magnets has fallen to a predetermined extent.

2. A motor controlling system consisting of means for governing the flow of current to the motor including a plurality of electromagnetic main switches; a plurality of blow out magnets for said switches; with auxiliary switches respectively controlled by the blow out magnets and connected to control the supply of current to the windings of the electromagnets for said main switches; said auxiliary switches being connected in multiple and said blow out magnets being connected to be simultaneously energized only when the motor is short circuited on itself.

3. A motor controlling system consisting of means for governing the flow of current to the motor and including an electromagnetic reversing switch; two blow out magnets for said reversing switch; with two auxiliary switches respectively controlled by said blow out magnets and connected in circuit with the windings of the reversing switch to prevent flow of current thereto until the current in the blow out magnets has fallen to a predetermined extent.

4. A motor controlling system consisting of a pair of fixed contacts connected to each other and to a current supply main; two movable members normally engaging said contacts respectively; a motor having its armature connected between said movable members; a second pair of fixed contacts connected to each other and to a second current supply main and capable of being respectively engaged by the movable members; electromagnetic means for causing either member to move into engagement with one of the second pair of contacts; a plurality of blow out magnets respectively connected between one of the fixed contacts and a current supply main; with switches controlled by said latter magnets for preventing the energization of the electromagnets whenever both of said blow out magnets are energized.

5. A motor controlling system consisting of means for governing the supply of current to the motor including a reversing switch having two actuating solenoids with contacts and connections arranged to short circuit the motor under predetermined conditions; blow out magnets for the reversing switch; two auxiliary switches connected in multiple to each other and respectively controlled by said blow out magnets; said auxiliary switches being connected between the windings of the solenoids and one of the current supply mains; with a pilot switch connected to control the flow of current to the solenoids.

6. A motor controlling system consisting of means for governing the flow of current to the motor and including an electromagnetic reversing switch having two solenoids; two blow out magnets for the reversing switch having connections whereby but one of them is energized when current is supplied to the motor; auxiliary switches respectively controlled by said blow out magnets and connected in multiple with each other, said switches being in circuit with the windings of the solenoids; the system including means for short circuiting the motor on itself, and the blow out magnets being connected to both to be energized when the motor is so short circuited.

7. A motor controlling system consisting of a plurality of electromagnetic switches and the necessary connections therefor; one of said switches consisting of two movable contacts; with a second switch having one of its contacts yieldingly connected to one of the movable contacts of said first switch; and means for yieldingly supporting the second contact of said switch.

8. The combination in a motor controlling system of means for governing the current flow to the motor, including a solenoid; a switch having one of its members connected to the core of the solenoid; means for movably supporting the second member of said switch; and a second switch having one of its members yieldingly connected to the second member of said first switch.

9. The combination in a motor controlling system of means for governing the supply of current to the motor including solenoid; a switch governed by said solenoid and having one of its members connected to the core thereof; means for yieldingly supporting the second member of the switch; a second switch having a contact yieldingly connected to said second switch member and a second contact for said second switch also having a yielding support.

In testimony whereof, I have signed my name to this specification, in the presence of two subscribing witnesses.

SAMUEL HINE KEEFER.

Witnesses:
GEO. B. WEAN,
C. W. BEITER.

Copies of this patent may be obtained for five cents each, by addressing the "Commissioner of Patents, Washington, D. C."